US012691399B2

(12) United States Patent
Cusack et al.

(10) Patent No.: US 12,691,399 B2
(45) Date of Patent: Jul. 28, 2026

(54) SIDELOAD DISINFECTING MODULAR FILTRATION SYSTEM

(71) Applicant: HEALTHWAY HOME PRODUCTS COMPANY INC., Pulaski, NY (US)

(72) Inventors: Timothy George Cusack, Central Square, NY (US); Jacob Michael D'Anna, Fulton, NY (US); Alexander Thomas Frechette, Mexico, NY (US); Xuchen Wang, Pulaski, NY (US)

(73) Assignee: HEALTHWAY HOME PRODUCTS COMPANY INC., Pulaski, NY (US)

( * ) Notice: Subject to any disclaimer, the term of this patent is extended or adjusted under 35 U.S.C. 154(b) by 552 days.

(21) Appl. No.: 18/329,258

(22) Filed: Jun. 5, 2023

(65) Prior Publication Data

US 2023/0390684 A1     Dec. 7, 2023

Related U.S. Application Data

(60) Provisional application No. 63/348,801, filed on Jun. 3, 2022.

(51) Int. Cl.
B01D 46/00 (2022.01)
B01D 46/42 (2006.01)
(Continued)

(52) U.S. Cl.
CPC ..... B01D 46/0032 (2013.01); B01D 46/0001 (2013.01); B01D 46/0006 (2013.01);
(Continued)

(58) Field of Classification Search
CPC ......... B03C 2201/04; B03C 3/82; B03C 3/47; B03C 3/41; B03C 3/155; B03C 3/025;
(Continued)

(56) References Cited

U.S. PATENT DOCUMENTS

| | | | | |
|---|---|---|---|---|
| 3,438,180 A | * | 4/1969 | Klouda | B03C 3/47 |
| | | | | 55/318 |
| 3,733,783 A | * | 5/1973 | Burney | B03C 3/72 |
| | | | | 96/81 |

(Continued)

FOREIGN PATENT DOCUMENTS

| | | |
|---|---|---|
| CA | 2712693 A1 | 2/2011 |
| CA | 2740466 A1 | 12/2011 |
| WO | 2012166513 A2 | 12/2012 |

OTHER PUBLICATIONS

International Search Report and Written Opinion for PCT Application No. PCT/US2023/067928, mailed on Sep. 21, 2023, 15 pages.

*Primary Examiner* — Jennifer Dieterle
*Assistant Examiner* — Phillip Y Shao
(74) *Attorney, Agent, or Firm* — Brake Hughes Bellermann LLP

(57)     ABSTRACT

A system includes an array of connected disinfecting filter assembly modules arranged in a plane to filter air that passes through the array as the air flows along an airflow pathway through the array. Each module includes a housing that defines a first slot and a second slot, and a power control unit. A pre-filter can be slid in its operating position along the first slot of the housing, and an electrically enhanced filter can be slid in its operating position along the second slot. The electrically enhanced filter includes a high voltage wire and a ground grid to create an electric field the high voltage wire and the ground grid and an electrical contact pad that electrically connects the power control unit to the high voltage wire when the electrically enhanced filter is located in its operating position in the second slot of the housing.

14 Claims, 8 Drawing Sheets

(51) Int. Cl.
B01D 46/58 (2022.01)
B01D 46/62 (2022.01)

(52) U.S. Cl.
CPC ..... B01D 46/0028 (2013.01); B01D 46/4209 (2013.01); B01D 46/4245 (2013.01); B01D 46/58 (2022.01); B01D 46/62 (2022.01); *B01D 2265/025* (2013.01); *B01D 2271/02* (2013.01); *B01D 2279/65* (2013.01)

(58) Field of Classification Search
CPC ... B03C 3/0175; B03C 3/011; B01D 2279/65; B01D 2271/02; B01D 2265/025; B01D 46/62; B01D 46/58; B01D 46/521; B01D 46/4245; B01D 46/4227; B01D 46/4209; B01D 46/121; B01D 46/0032; B01D 46/0028; B01D 46/0013; B01D 46/0006; B01D 46/0001; A61L 2209/16; A61L 2209/14; A61L 9/16
See application file for complete search history.

(56) References Cited

U.S. PATENT DOCUMENTS

| | | | |
|---|---|---|---|
| 4,549,887 A * | 10/1985 | Joannou | B03C 3/14 96/58 |
| 5,232,478 A * | 8/1993 | Farris | B03C 3/155 96/26 |
| 7,351,274 B2 * | 4/2008 | Helt | B03C 3/12 96/26 |
| 2004/0118093 A1 * | 6/2004 | Chang | B01D 46/0006 55/482 |
| 2009/0025559 A1 | 1/2009 | Mello et al. | |

* cited by examiner

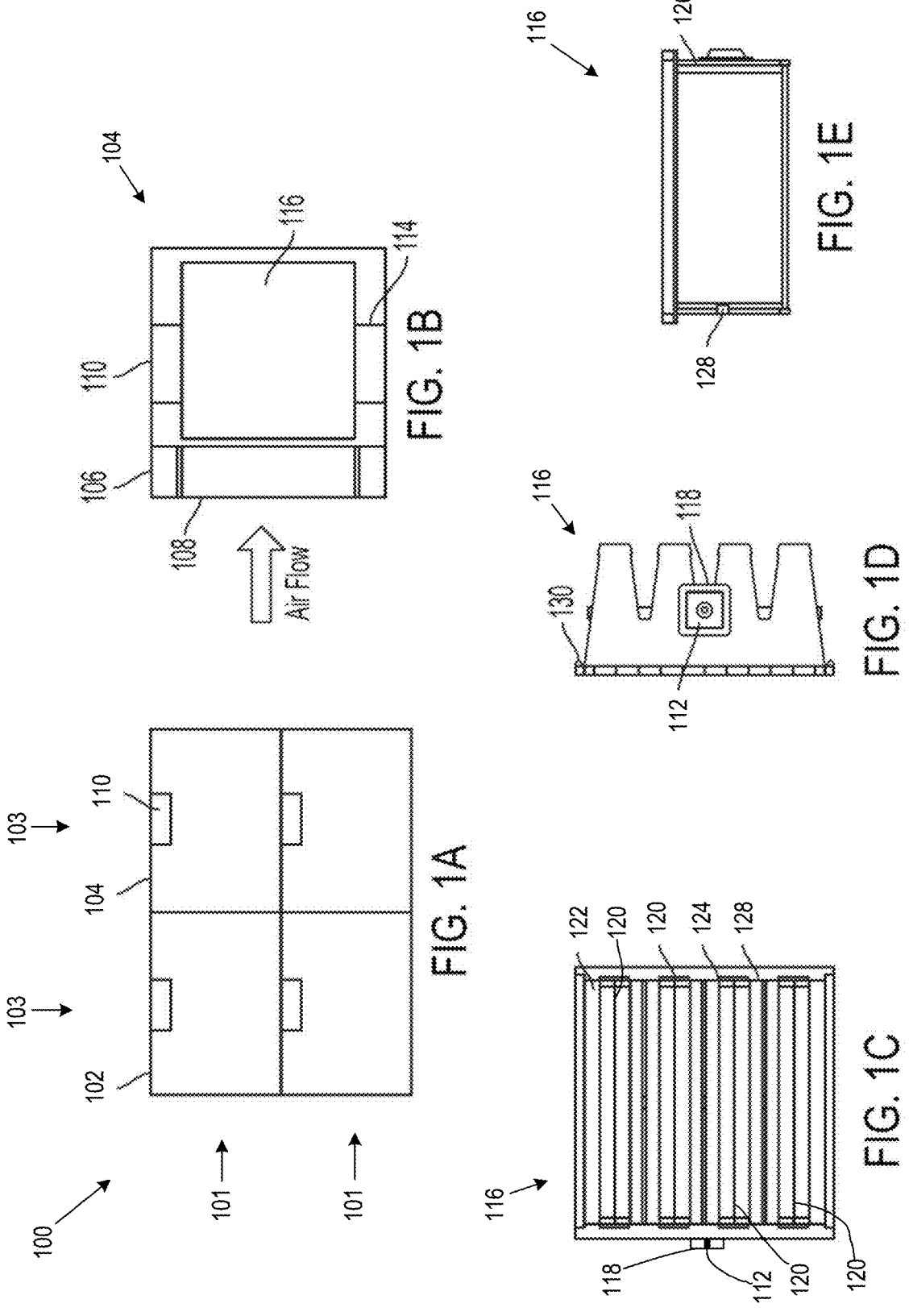

700 sliding a plurality of pre-filters through the first slot of a first module of the row, such that each pre-filter is disposed in the first slot of its respective module in a first plane substantially perpendicular to the airflow pathway;  — 702 sliding a plurality of electrically enhanced filter through the second slot of the first module of the row, such that each pre-filter is disposed in the second slot of its respective module in a second plane substantially perpendicular to the airflow pathway, the second plane being downstream from the first plane along the airflow pathway  — 704 clamping the plurality of electrically enhanced filters into an airtight interface with the housings of the respective disinfecting filter assembly modules  — 706

FIG. 7

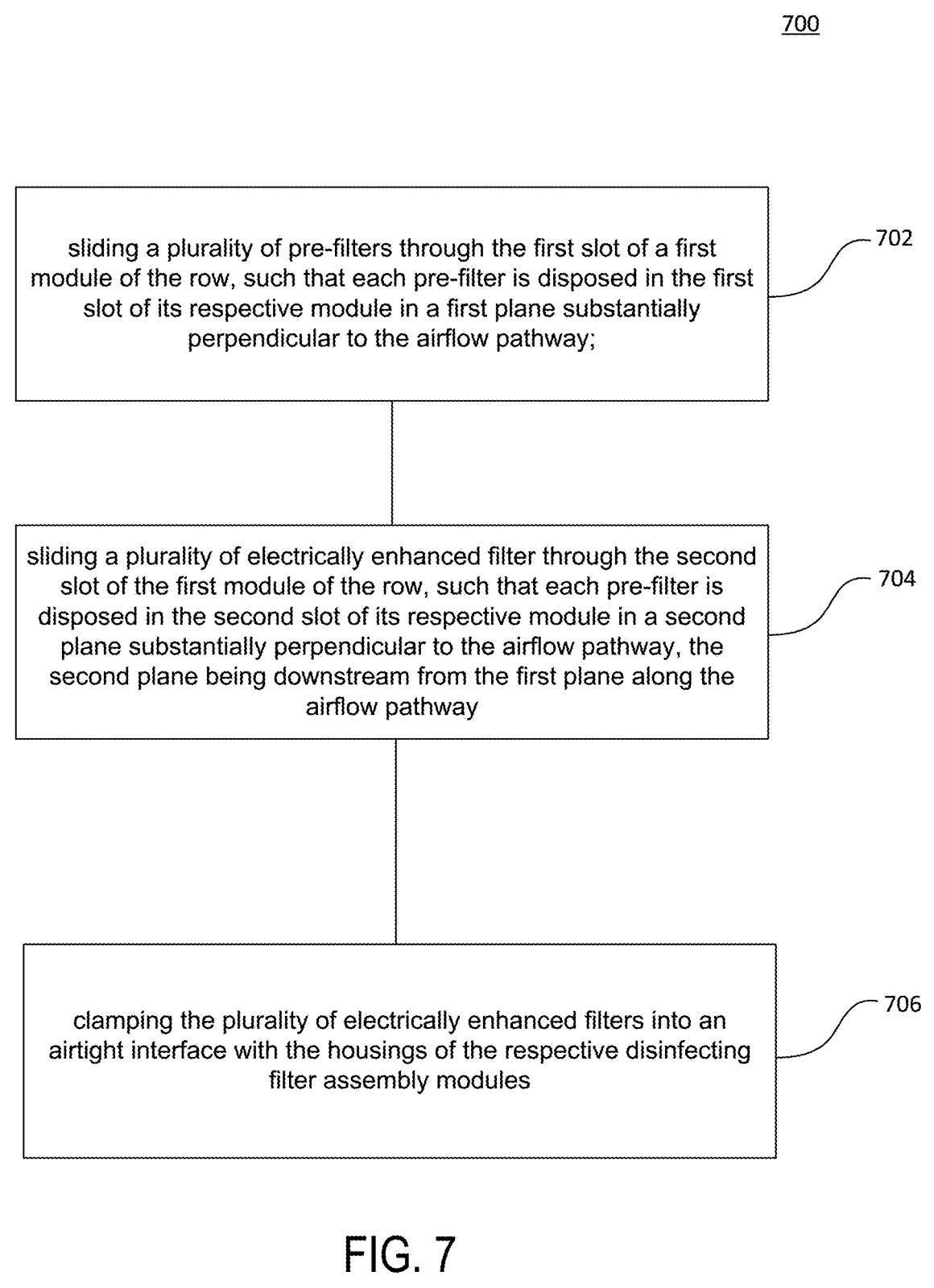

SIDELOAD DISINFECTING MODULAR FILTRATION SYSTEM

CROSS-REFERENCE TO RELATED APPLICATIONS

This application claims the priority benefit of U.S. Provisional Patent Application No. 63/348,801, filed Jun. 3, 2022, and titled "SIDELOAD DISINFECTING MODULAR FILTRATION SYSTEM," the disclosure of which is incorporated by reference.

FIELD OF THE DISCLOSURE

The present disclosure is generally related to the filter assemblies for air purification systems and techniques for replacing those filter assemblies and, in particular to a sideload disinfecting filtration system.

BACKGROUND

Various types of air filters have been made for many years. Conventional air filters pass a flow of air through a filter, where the filter traps particles that are larger than a characteristic hole size associated with the filter. With the emergence of new infectious diseases caused by various pathogens (such as coronavirus COVID-19, antibiotic resistant bacteria, and antifungal resistant fungi), the need to filter very small particles out of the air has increased dramatically. The size of viruses range from 20 nanometers (nm) to about 5000 nm, where COVID-19 has a diameter of about 100 nm.

However, as the hole size of a filter decreases, a resistance to the airflow due to the filter increases. Therefore, fans or pumps that force air through an air filtration system having a filter must be more powerful in order to maintain a given airflow rate when denser filters are used. Thus, increasing an amount of filtering capability by using a filter with a smaller hole size results in increased costs associated with operating or manufacturing an air filtering system, because, in general, a fan or pump will require larger amounts of power to maintain an airflow rate through a small-hole-size filter than is required to maintain the same airflow rate through a larger-hole-size filter. Alternatively, a larger, more powerful, and generally more expensive fan or pump may be required when a small-hole-size filter is used than when a larger-hole-size filter is used.

A technique that has been used to filter air, is to charge particles in an airflow using a high voltage and then capture the charged particles on a surface that has a different or opposite charge. Such air filters are commonly referred to as ionizing or ionizer air purifiers. Ionizing air purifiers, however, generate ozone that is emitted into environments where people live and work, and people who breathe ozone commonly suffer from health effects that include chest pain, coughing, throat irritation, and congestion. Breathing ozone is also associated with various illnesses and increased rates of bronchitis, emphysema, and asthma.

Another limitation of conventional air filtering systems is that filters contained within such systems can be difficult to replace. Tools such as a screwdriver or wrench are often required to access and replace a filter, such that parts such as screws or nuts that must be removed to replace a filter may be lost and this may result in air passing around instead of through an air filter system or portions thereof. In addition, design of an air filtration system may require that filters are located in positions that are difficult to access, thus making replacement of the filters difficult, cumbersome, and time-consuming.

It is therefore desirable to provide an air purification system that can continuously capture very fine particles and live organisms, while minimizing the expense of the fans and pumps used to force air through filters of the air purification system. Additionally, it is desirable to configure the filters such that they are easy to access and replace.

SUMMARY

In an aspect, the techniques described herein relate to a system including: an array of a plurality of connected disinfecting filter assembly modules arranged in a plane substantially perpendicular to an airflow pathway and configured to filter air that passes through the array as the air flows along the airflow pathway through the array, each disinfecting filter assembly module including: a housing that defines a first slot and a second slot; a power control unit, a pre-filter configured to be located in the first slot of the housing, such that it is disposed in a first plane substantially perpendicular to the airflow pathway, and an electrically enhanced filter configured to be located in the second slot of the housing, such that it is disposed in a second plane substantially perpendicular to the airflow pathway, the second plane being downstream from the first plane along the airflow pathway, the electrically enhanced filter including a high voltage wire and a ground grid, where an electric field is created between the high voltage wire and the ground grid when the high voltage wire is energized to a high voltage, the electrically enhanced filter including an electrical contact pad that electrically connects the power control unit to the high voltage wire when the electrically enhanced filter is located in an operating position in the second slot of the housing; and a side-mounted access panel on at least one of the disinfecting filter assembly modules, which, when removed, exposes the first slot and the second slot, such that two or more pre-filters can be slid sequentially in the first plane through the first slot of a disinfecting filter assembly module into their operating positions within their respective housings of their respective assembly modules, the respective assembly modules being located adjacent to each other in a row of the array, and such that two or more electrically enhanced filters can be slid sequentially in the second plane through the second slot of the disinfecting filter assembly module into their operating positions within the respective housings of the respective assembly modules. Implementations can include one or more of the following features, alone or in any combination with each other.

For example, the system can further include an electrical power input connector configured for receiving electrical power, the electrical power input connector being electrically connected to the power control units of the disinfecting filter assembly modules of the row, where the power control units are connected in parallel with the electrical power input connector.

In another example, each disinfecting filter assembly module in the row of the array can include an electrical connector configured for electrically connecting the power control unit of the disinfecting filter assembly module to another disinfecting filter assembly module in the row of the array that includes the disinfecting filter assembly module.

In another example, the housing and the second slot can be configured such that upon sliding an electrically enhanced filter into its operating position in the second slot, the electrical contact pad of the electrically enhanced filter is electrically connected to the power control unit of the disinfecting filter assembly module in which the electrically enhanced filter is located.

In another example, the housing and the second slot can be configured such that upon sliding an electrically enhanced filter into its operating position in the second slot, the ground grid of the electrically enhanced filter is electrically connected to an electrically grounded portion of the disinfecting filter assembly module in which the electrically enhanced filter is located.

In another example, the housing of each disinfecting filter assembly module can include a first fixed rail member and a second fixed rail member, where the first and second fixed rail members define the first slot.

In another example, a distance between the first and second fixed rail members can be less than 110% of a thickness of a frame of the pre-filters that are configured to be positioned in the first slot.

In another example, at least one of the first and second fixed rail members can include a surface facing the first slot, where the surface includes a material that is deformable by the a frame of the pre-filters when the pre-filters are positioned in the first slot.

In another example, the system can further include a mechanical locking mechanism configured to position the two or more electrically enhanced filters of the modules in the row into an airtight interface with the housings of the respective disinfecting filter assembly modules that include the two or more electrically enhanced filters.

In another example, the mechanical locking mechanism can be further configured to position the two or more electrically enhanced filters of the modules in the row into an electrical ground connection the housings of the respective disinfecting filter assembly modules that include the two or more electrically enhanced filters.

In another example, the system can further include a plurality of gaskets, with each gasket of the plurality of gaskets being positioned between a different electrically enhanced filter and the housing of the respective disinfecting filter assembly module, where the mechanical locking mechanism is further configured to press each of the two or more electrically enhanced filters toward its respective housing to compress the gasket between the electrically enhanced filter and the housing.

In another example, the plurality of connected disinfecting filter assembly modules can be physically connected and configured to fit into an air ducting system.

In another example, the housing of each disinfecting filter assembly module can be configured for physically connecting to an adjacent disinfecting filter assembly module in the row.

In another example, the housing of each disinfecting filter assembly module can further include a slidable tray configured for housing the power control unit of the module, the slidable trays of the modules in the row being physically connected, such that the trays of the modules in the row move together when a tray of an outer module of the row is slid out of its module.

In another aspect, the techniques described herein relate to a system including: an array of a plurality of connected disinfecting filter assembly modules arranged in a plane substantially perpendicular to an airflow pathway and configured to filter air that passes through the array as the air flows along the airflow pathway through the array, each disinfecting filter assembly module including: a housing that defines a first slot and a second slot; a power control unit, a pre-filter configured to be located in the first slot of the housing, such that it is disposed in a first plane substantially perpendicular to the airflow pathway, and an electrically enhanced filter configured to be located in the second slot of the housing, such that it is disposed in a second plane substantially perpendicular to the airflow pathway, the second plane being downstream from the first plane along the airflow pathway, the electrically enhanced filter including a high voltage wire and a ground grid, where an electric field is created between the high voltage wire and the ground grid when the high voltage wire is energized to a high voltage, where two or more pre-filters can be slid sequentially from outside a disinfecting filter assembly module through the first slot of the disinfecting filter assembly module in the first plane and into their operating positions within their respective housings of their respective assembly modules, the respective assembly modules being located adjacent to each other in a row of the array, and such that two or more electrically enhanced filters can be slid sequentially from outside the disinfecting filter assembly module through the second slot of the disinfecting filter assembly module in the second plane the disinfecting filter assembly module into their operating positions within the respective housings of the respective assembly modules; and a clamp configured to position the two or more electrically enhanced filters of the modules in the row into an airtight interface with housings of the respective disinfecting filter assembly modules that include the two or more electrically enhanced filters. Implementations can include one or more of the following features, alone or in any combination with each other.

For example, the clamp can be further configured to position the two or more electrically enhanced filters of the modules in the row into an electrical ground connection the housings of the respective disinfecting filter assembly modules that include the two or more electrically enhanced filters.

In another example, the system can further include a plurality of gaskets, with each gasket of the plurality of gaskets being positioned between a different electrically enhanced filter and the housing of the respective disinfecting filter assembly module, where the clamp is further configured to press each of the two or more electrically enhanced filters toward its respective housing to compress the gasket between the electrically enhanced filter and the housing.

In another example, the housing of each disinfecting filter assembly module can include a first fixed rail member and a second fixed rail member, where the first and second fixed rail members define the first slot.

In another example, a distance between the first and second fixed rail members can be less than 110% of a thickness of a frame of the pre-filters that are configured to be positioned in the first slot.

In another example, at least one of the first and second fixed rail members includes a surface facing the first slot, where the surface includes a material that is deformable by a frame of the pre-filters when the pre-filters are positioned in the first slot.

In another example, the plurality of connected disinfecting filter assembly modules can be physically connected and configured to fit into an air ducting system.

In another example, the clamp can include a movable rail oriented substantially parallel to the second slot, one or more rotatable members attached to the movable rail, and a lever, the lever being operable to cause the one or more rotatable members to rotate, wherein rotation of the one or more rotatable members causes the movable rail to move in a direction such that a width of the second slot is decreased.

In another example, the housing of each disinfecting filter assembly module can be configured for physically connecting to an adjacent disinfecting filter assembly module in the row.

In another example, the housing of each disinfecting filter assembly module can further include a slidable tray configured for housing the power control unit of the module, the slidable trays of the modules in the row being physically connected, such that the trays of the modules in the row move together when a tray of an outer module of the row is slid out of its module.

BRIEF DESCRIPTIONS OF THE DRAWINGS

FIG. 1A is a schematic front view of a modular sideload disinfecting filtration system.

FIG. 1B is a schematic side view of a module of the modular sideload disinfecting filtration system.

FIG. 1C is a schematic front view of an electrically enhanced filter of a module of the modular sideload disinfecting filtration system.

FIG. 1D is a schematic top view of the electrically enhanced filter.

FIG. 1E is a schematic rear view of the electrically enhanced filter.

FIG. 7 is a flow chart of a process for placing filters into a modular sideload disinfecting filtration system.

DETAILED DESCRIPTION

Figure 2B:
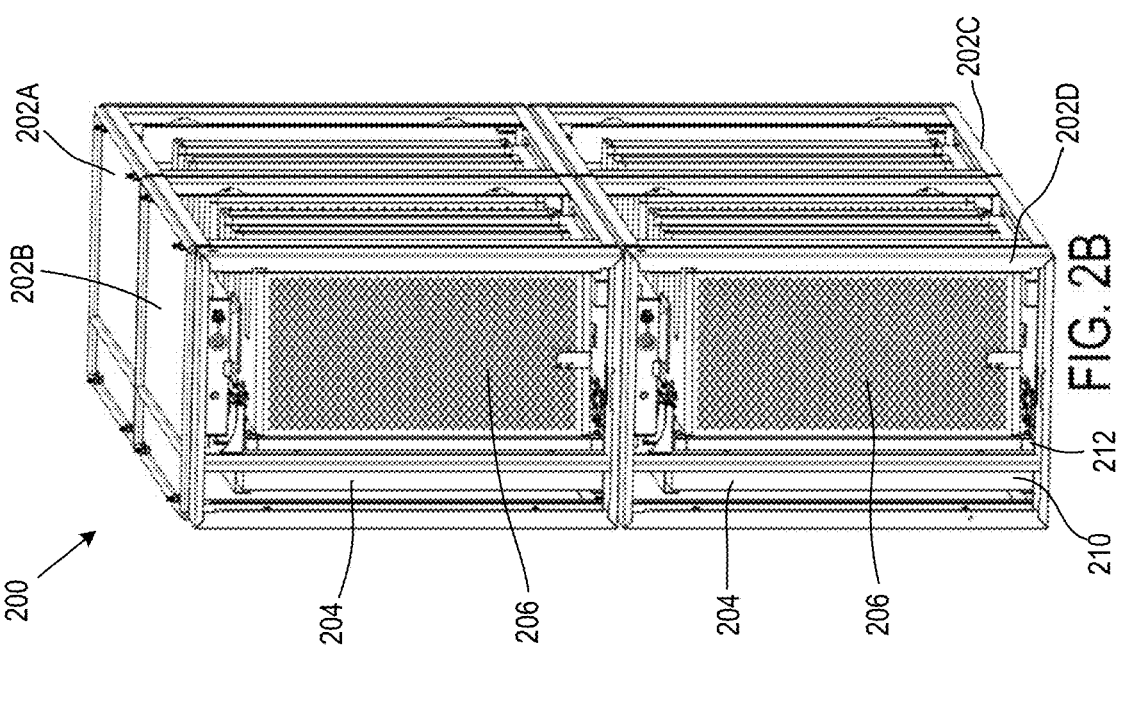
FIG. 2B is a schematic rear perspective view of an array of modules of a modular sideload disinfecting filtration system.

A disinfecting filtration system (DFS), also referred to as electrically enhanced filtration (EEF), is an air purification system that uses two mechanisms to maintain high air cleaning performance. An EEF air purification system may use a high energy field to facilitate the aggregation and capture of ultrafine particles. Such a system may effectively increase particle size by forming clusters of ultrafine particles. Such a high energy field may be controlled in a manner that contains and captures charged particles without emitting charged particles from the filter system. Such a filtering process may be based on an "entry ground control grid" that is located before a front part of a main filter and a "rear control grid" (or "exhaust control grid") that may be affixed to a rear part of the main filter. The entry ground control grid and the rear/exhaust control grid may be tied to an Earth ground connection that prevents these grids from being energized by the high energy field. Each of the ground control grid and rear/exhaust control grid may be a screen that includes holes that do not allow service personnel to reach into an energized portion of a disinfecting filtration system.

Even in instances where ions generated by the high energy field, such charged particles are isolated in the main filter between the entry control grid and the rear/exhaust control grid on a rear side of the filter. The controlled, isolated high energy field generated by the EEF continually creates high energy exposure through pleats and fibers of a main filter creating a microbiostasis ("prevention of organism growth") in the main filter. This may prevent live organisms from escaping back into the air. These two mechanisms work together to provide the ultraclean filtration of particles as well as continual prevention of organism growth in the EEF filter.

One or more pre-filters, located upstream of the main filter, can be used to remove larger particles and may increase the effective lifespan of electrically enhanced filters and reduce the load placed on a heating ventilation and air conditioning (HVAC) system caused by the requisite the drop in air pressure between an upstream and downstream side of the main filter as air is pushed through the main filter. In some implementations, pre-filters are replaced more frequently than the electrically enhanced filters, as failure to do so may limit the effectiveness of the air filtration system and increase the pressure drop load placed on the HVAC system. The replacement of pre-filters and main filters should be as simple a process as possible, and ideally require little to no expertise.

Larger capacity air handling systems often require customized air filtration equipment to meet their dimensions and air handling needs. Customizing these systems often requires one-off hardware to meet these specifications, but customization significantly increases the installation cost and will often lead to more complex servicing needs. These complex servicing needs may require expensive technicians and specialized tools to execute, significantly increasing the cost of ownership of these systems.

It is therefore desirable to provide an air purification system that can continuously capture fine particles and live organisms while maintaining a low pressure drop across the filters and reducing the amount of technical expertise required to replace the consumable filters. In addition, a system may come in the form of modular building block style of units that can be easily connected and configured to meet the air handling and filtration needs of a given application without increasing the need for service expertise.

FIG. 1A is a schematic front view of a modular sideload disinfecting filtration system 100. The system 100 includes a disinfecting filter array 102 of a plurality of disinfecting filter assembly modules 104. The disinfecting filter array 102 can include one or more rows 101 and columns 103, each row and column having one or more modules 104. The disinfecting filter array 102 is an assembly that allows for quick connection of at least two parallel disinfecting filter assembly modules 104 that each house an electrically enhanced filter and a power control unit 110 that provides electrical power to the electrically enhanced filter. In some implementations, the disinfecting filter array 102 may have a number of filter assembly modules 104 that are of a uniform size. In some implementations, there may be variations in the size of filter assembly module 104 to allow the array 102 to fill a ducting space being used in a given air filtration application. Each filter assembly module 104 is mounted in the disinfecting filter array 102. In some implementations, the modules 104 of the array 102 can be arranged in a plane. In some implementations, at least some of the modules 104 of a row of the array 102 can be arranged in a plane. The plane can be substantially perpendicular (e.g., within five degrees of perpendicular or within two degrees of perpendicular) to an airflow pathway of air that passes through the array 102 and that is filtered by the array.

FIG. 1B is a schematic side view of a module 104 of the modular sideload disinfecting filtration system 100. The module includes a pre-filter frame 106 that holds a pre-filter 108, where the pre-filter can be a passive (e.g., non-electrically enhanced) filter that filters an airflow that passes through the pre-filter 108 to capture particles in the air that are smaller than a characteristic hole size of the pre-filter. The module also includes an electrically enhanced filter 116. In some implementations, electrically enhanced filter 116 can be a V-Bank filter, such as described in U.S. Patent Publication No. 20220040625, which is incorporated herein by reference for all purposes. The module 104 includes a power control unit 110 that controls the power provided to the electrically enhanced filter 116 to create a high-energy electric field in the filter media of the filter 116. Electrical power can be supplied in parallel to the power control unit 110 in each of the module 104 of a row 101, to each module of a column 103, or to all modules of the array 102. The module also includes a ground contact 114 that can electrically ground one or more portions of the module 104 and the filters 108, 116 that are housed in the module.

Implementations can include a pre-filter frame 106 that may mount to the front (i.e., upstream in the airflow direction) of each filter assembly module 104 in the disinfecting filter array 102. In some implementations, the pre-filter frame 106 is configured to support and hold in position a pre-filter 108 that captures large particles before they may enter the electrically enhanced filter 116. In some implementations, the pre-filter 108 has a minimum efficiency reporting value (MERV) rating of at least MERV 4. The minimum size of particles captured by the pre-filter 108 as air flows through the pre-filter filter 108 in a pre-filtration process can vary depending upon the application and the resistance to the airflow capacity of the HVAC system in which the system 100 is used.

Implementations can include an electrically enhanced filter 116 that is configured and packaged to slide into the filter assembly module 104, without the need to wire the power control unit 110 to the electrically enhanced filter 116, but where required electrical connection(s) between the electrically enhanced filter 116 and the power control unit 110 is/are established by mechanically positioning the electrically enhanced filter 116 in its operating position in the module 104, which caused an electrical connection to be established between a contact of the filter assembly 104 and a corresponding contact in electrical connection with the power control unit 110. The electrically enhanced filter 116 has a less dense media (for example, 97 DOP) as compared to a standard HEPA filter (e.g., 99.97 DOP), which allows the filter 116 to have a higher gram holding weight and thus allows for more dust holding capacity as compared to a standard HEPA filter and therefore results in increased filter life, as compared to a HEPA filter. Because of the lower-density media used in the electrically enhanced filter 116, the electrically enhanced filter 116 also can have a lower resistance to airflow through the filter 116, as compared to a HEPA filter with a similar filtering ability. Also, because of the lower-density media used in the electrically enhanced filter 116, the air pressure drop across the electrically enhanced filter 116 can be approximately four times less than the pressure drop across a HEPA filter with a similar filtering ability. Furthermore, because the filter media fibers of the electrically enhanced filter 116 are continually exposed to the high-energy electric field, a microbiostatis effect is created in the media of the electrically enhanced filter 116.

FIG. 1C is a schematic front view of an electrically enhanced filter 116 of a module 104 of the modular sideload disinfecting filtration system 100. FIG. 1D is a schematic top view of the electrically enhanced filter 116. FIG. 1E is a schematic rear view of the electrically enhanced filter 116. In some implementations, the electrically enhanced filter 116 can include a plurality of V-Bank filters (e.g., four V-Bank filters are shown in FIG. 1C). The electrically enhanced filter 116 can include one or more high voltage wires 120, an entry control grid 122, a high voltage transfer grid 124, ground bar 128, power contact pad 118, and a rear control grid 126. The entry control grid 122 may have a surface similar to a screen, chicken wire, or a plate perforated with holes that prevents a person from touching the high voltage wires 120 or other energized components (e.g., the high voltage transfer grid 124) within the electrically enhanced filter 116. Rear control grid 126 may also have a surface like a screen, chicken wire, or perforated plate. The entry control grid 122 and rear control grid 126 can be electrically grounded. The high voltage transfer grid 124 may be charged to a high voltage, and this grid may be positioned in close proximity to filter elements included in an electrically enhanced filter 116.

In some implementations, the rear ground control grid 126 can be fastened, taped, glued, or otherwise attached to the filter media and grounded on the ground bar 128. The rear ground control grid 126 helps to move ultra-fine particles as much as possible into the media and also eliminates the electrostatic field effects outside the filter media. Implementations may include a ground bar 128 located on the face of the electrically enhanced filter 116. The ground bar 128 may be in electrical connection with each of the rear ground control grids 126, so as to ground the grids 126. A locking mechanism may secure the electrically enhanced filter 116 in the filter assembly module 104 and compress the ground bar 128 into contact with the module 104. For example, the electrically enhanced filter 116 may include a front-end assembly 130 on the intake side of the electrically enhanced filter 116, and the front-end assembly may include, or receive, a gasket that is compressed against the filter assembly module 104 to create an airtight seal between the module and the front-end assembly 130. The front-end assembly 130 may also serve to properly align and support the electrically enhanced filter 116 in the filter assembly module 104.

Electrical power may be routed to the high voltage wires 120 of V-Bank filters in a module from a power control unit 110 of the module via a high voltage contact 112 of a contact pad 118 of the module and through connecting wires or high voltage transfer grids. A ground contact 114 can provide an electrical ground connection to a frame or electrical connector of the respective V-Bank filter. In certain instances, a power connector may couple electrical power from power control unit 110 to a high voltage contact 112 of a power contact pad 118 when the electrically enhanced filter 116 is slid into the a frame of a filter assembly module 104. Upon sliding the electrically enhanced filter 116 into its operating position in the filter assembly module 104, the ground contact 114 may contact the electrically enhanced filter 116 and ground the filter 116. An electrically enhanced filter 116 may be slid into a respective receiver slot of the module using rails or protrusions/slots (not illustrated in FIGS. 1A-1E). After aligning an electrically enhanced filter 116 with a receiver slot in the module 104, the act of sliding the electrically enhanced filter 116 into its operating position in the module may result in power and ground connections between the high voltage wires 120 and the power control unit 110 and between the control grids 122, 126 and the ground contact 114 being formed automatically based on the alignment of electrical couplings between the receiver section to the electrically enhanced filter 116.

A power control unit 110 may activate and control a high energy field in the electrically enhanced filter 116 by delivering a voltage to a high-voltage contact or wires connected to high voltage wires 120. In some implementations, a high-voltage contact may be located on the top of the module and in electrical contact with the power control unit 110, Such a contact may be configured to allow for a quick connection of power to an electrically enhanced filter 116 that is slid into its operating position in the module 104. When an electrically enhanced filter 116 is inserted into the module 104, this high-voltage contact may be configured to contact the contact pad 118 to conduct electricity from the control unit 110 to the high voltage wire 120 via metallic elements the high-voltage contact 112 of the contact pad 118. In such an implementation, the electrically enhanced filter 116 may be inserted into module 104 in an orientation where contact pad 118 is located at the top of the module 104. In addition, the ground contact 114 may be located on the bottom of the module, such that when the electrically enhanced filter 116 is inserted into the module 104, the ground contact 114 contacts the ground bar 128 of the filter 116 to electrically ground the filter 116. In this way, the electrically enhanced filter 116 may be configured to slide into the module 104 without the need for a person to manually connect the electrical power to the electrically enhanced filter 116.

Figure 2A:
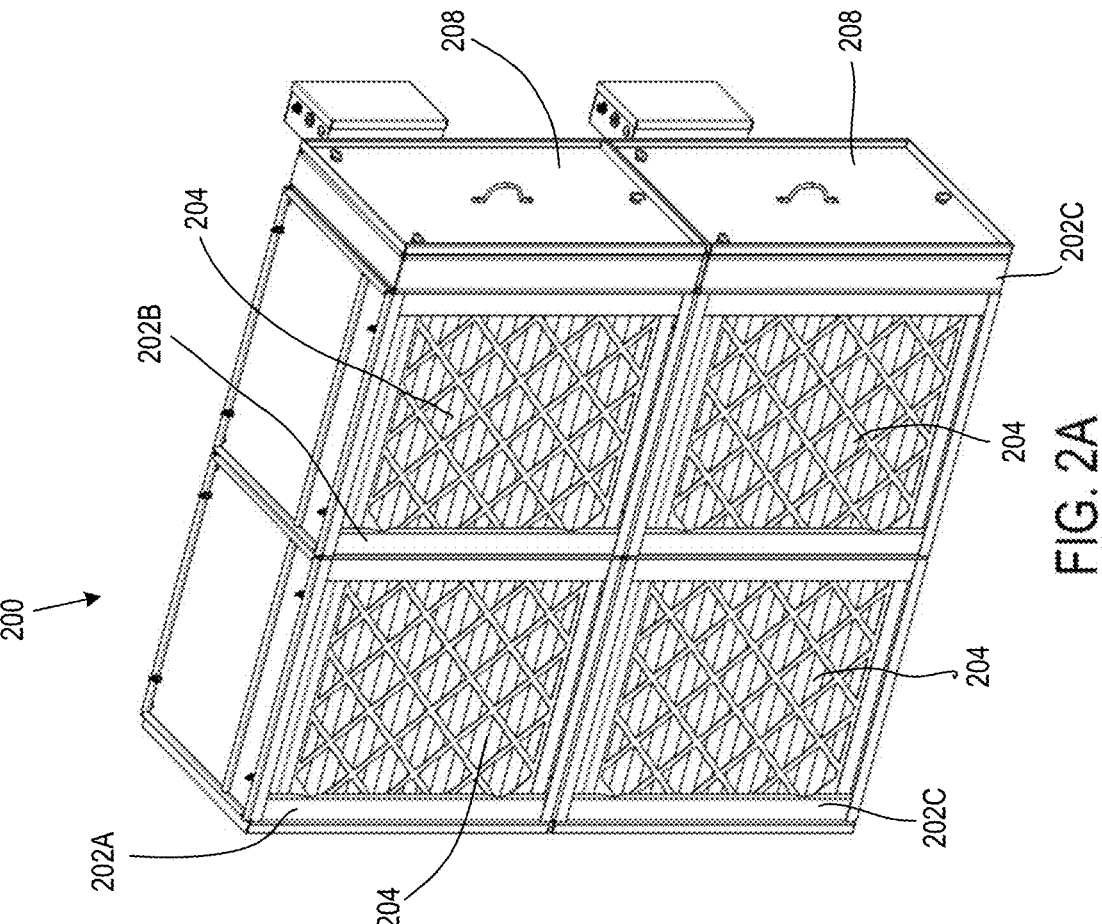
FIG. 2A is a schematic front perspective view of an array of modules of a modular sideload disinfecting filtration system.

FIG. 2A is a schematic front perspective view of plurality of modules 202A, 202B, 202C, 202D of a disinfecting filter array 200 of a modular sideload disinfecting filtration system. FIG. 2B is a schematic rear perspective view of an array of attached modules 202A, 202B, 202C, 202D of a disinfecting filter array 200. The array 200 includes four modules 202A, 202B, 202C, 202D arranged in a 2×2 configuration in a plane, where the array has two rows and two columns, with two modules in each of the rows and columns. In the displayed example, two views of a two-by-two disinfecting filter array 200 are presented. FIG. 2A displays a two-by-two disinfecting filter array 200 from the air intake side of the filter assembly modules 202A, 202B, 202C, 202D. FIG. 2B displays an access side of the disinfecting filter array 200. Pre-filters 204 are located in a first plane, and electrically enhanced filters 206 are located in a second plane, when located in their operating positions. In the array 200, the direction of airflow is through pre-filters 204 located on the air intake side of the modules 202A, 202B, 202C, 202D and then through electrically enhanced filters 206 and then out of the modules 202A, 202B, 202C, 202D.

Each row of the array 200 of modules 202A, 202B, 202C, 202D includes a removable side-mounted access panel 208 on at least one of the disinfecting filter assembly modules. In FIG. 2A, the panels 208 are shown in their closed positions in which they enclose the filters 204, 206 in the modules 202A, 202B, 202C, 202D. When the panel 208 is removed, an interior of the modules is exposed, and the filters 204, 206 for a row can be slid into their operating positions from the side of a module 202 at an end of the row. In some implementations, the filters 204, 206 in a row of modules can be slid sequentially through the module at an end of a row of modules (i.e., closest to the side-mounted access panel 208) into their respective operating positions in their respective modules. For example, when a panel 208 at the end of the row of modules 202C, 202D is removed, two or more pre-filters 204 can be slid sequentially in the first plane through a first slot 210 of module 202D into their operating positions within respective housings of their modules 202C, 202D. The pre-filter 204 for module 202C is slid through module 202D and then into its operating position in module 202C, and the pre-filter 204 for module 202C is slid into its operating position in module 202D. In some implementations, the pre-filter 204 for module 202C can be pushed into its operating position by the pre-filter 204 for module 202D, when the pre-filter for module 202D is slid into its operating position from the side of module 202D.

Likewise, the electrically enhanced filters 206 for the modules 202C, 202D of a row can be slid sequentially in the second plane through a second slot 212 of module 202D into their operating positions within the respective housings of the modules 202C and 202D. Replacing the filters 204, 206 from the side of the array can be advantageous when the array is positioned in an air duct, and access to the front and back sides of the array is difficult or impossible, because of the structure of the air duct.

In some implementations, the array 200 can include one or more external control boxes 220A, 220B that can receive power (e.g., AC wall power) and provide the power to the power control units of the modules in the system. The external control boxes 220A, 220B also can receive various signals from the modules and provide information to a user based on the received signals. For example, the modules can include one or more alignment indicators or interlocks that indicate whether components of the modules are properly aligned in their operating positions, and this information can be provided to the external control boxes 220A, 220B. In response to the received information the external control boxes 220A, 220B can provide information (e.g., in the form of indicator lights) to a user and/or can control the power provided to the modules (e.g., can provide power only when the received information indicates that the modules are properly aligned in their operating positions). In some implementations, each row of the array 200 can include an external control box 220A, 220B. In some implementations, the array 200 can include one external control box 220A for all of the modules of the system.

Figure 3:
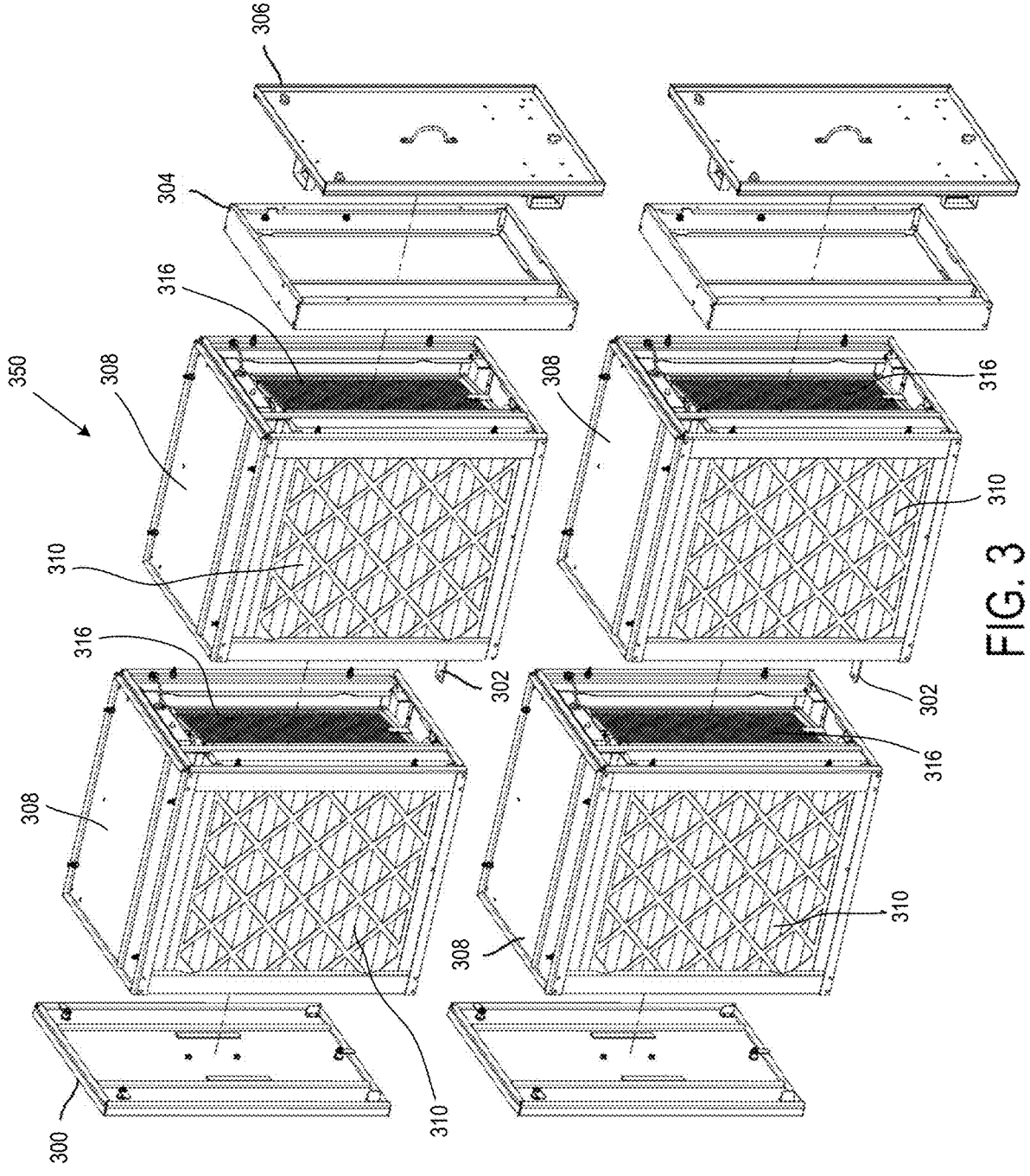
FIG. 3 is an exploded view of components of an array of modules of a modular sideload disinfecting filtration system.

FIG. 3 is an exploded view of components of an array 350 of modules 308 of a modular sideload disinfecting filtration system. The array 350 includes four modules 308 having electrically enhanced filters in a two-by-two arrangement viewed from the air intake side of the array. Pre-filters 310 are located in the modules on the air intake side of the modules 308. Each row of modules include a backplate 300 to which an adjacent filter assembly module 308 is secured. The filter assembly modules 308 along each row can be attached, fastened, or otherwise secured to each other (e.g., with bolts and nuts). Each module 308 can include a locking mechanism (described further below) for securing the electrically enhanced filters in their operating positions in the modules. A connecting linkage 302 can couple the locking mechanisms between modules 104. The access end of each row can include a retaining bracket 304 and an access panel 306 located at the serviceable end of each row. The access panel 306 can be opened or removed to allow pre-filters 310 and the electrically enhanced filters 316 to be changed out of the filter assembly modules 308 and to allow access to the power control units of the modules for servicing and replacement. The power control units are coupled together to allow other filter assembly modules 308 to continue to function in the event of a failure in one of them. Each filter assembly module 308 can be assembled in a row, and each row of filter assembly modules 308 to be secured together into a stacked disinfecting filter array 350.

Figures 4A, 4B, 4C:
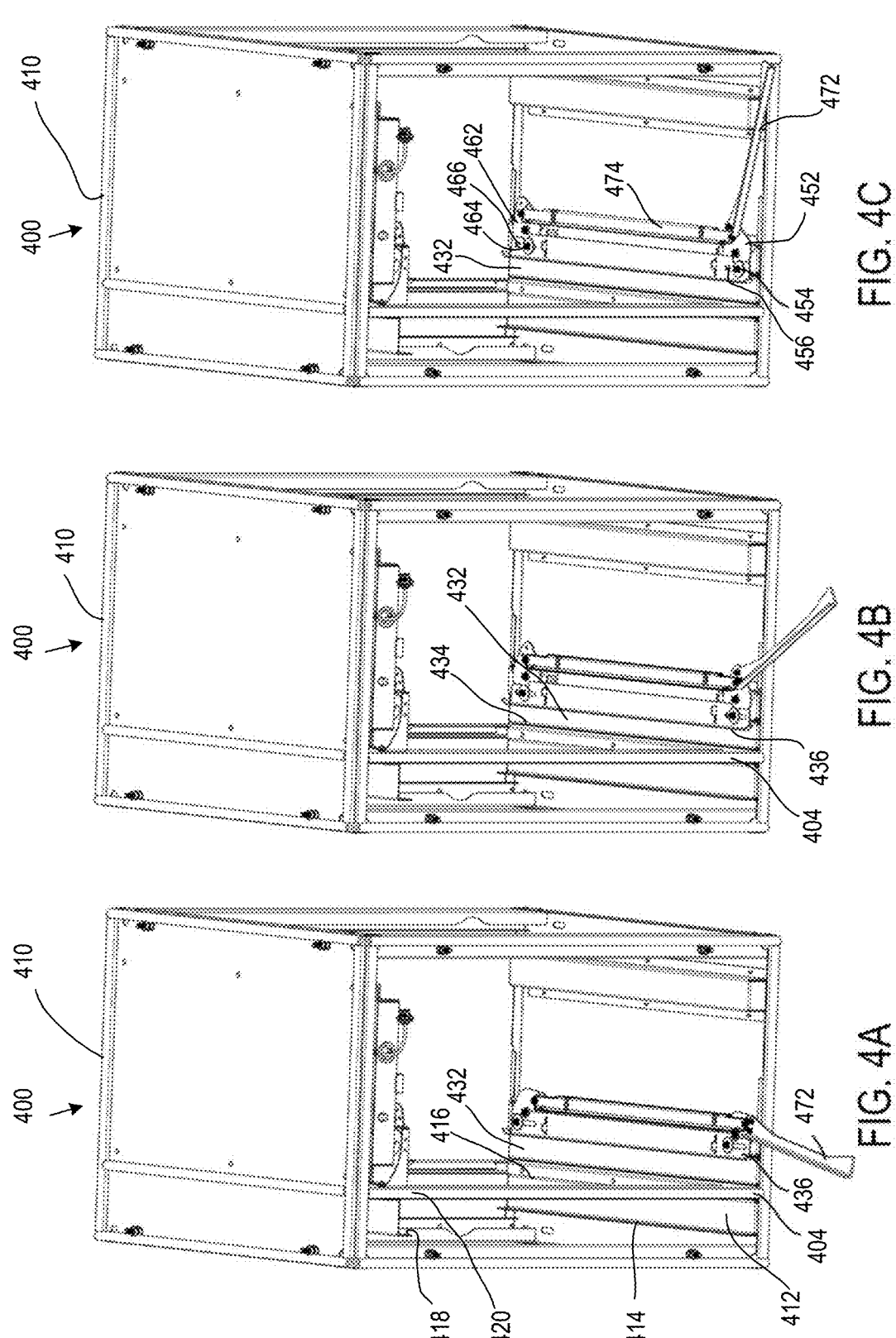
FIGS. 4A, 4B, 4C, 4D, 4E, 4F are schematic views of a mechanical locking mechanism used in an array of modules of a modular sideload disinfecting filtration system.

FIGS. 4A, 4B, 4C, 4D, 4E, 4F are schematic views of a housing of a module of a modular sideload disinfecting filtration system, where the housing includes a mechanical locking mechanism used to secure a filter, with different positions of the locking mechanism being shown in FIGS. 4A, 4B, 4C. A module 400 includes a housing 410 that is configured for holding a pre-filter and an electrically enhanced filter in position. The housing 410 can define a first slot 412 configured for receiving and holding the pre-filter in position and a second slot 432 configured for receiving and holding the electrically enhanced filter in position.

The first slot 412 can be defined by a first fixed rail member 414 and a second fixed rail member 416 that is substantially parallel to the first fixed rail member (e.g., within five degrees of parallel or within two degrees of parallel). In some implementations, the second fixed rail member 416 can be part of a frame member 404 of the housing 410. In some implementations, the first slot can be further defined by a third fixed rail member 418 and a fourth fixed rail member 420 that is substantially parallel to the third fixed rail member (e.g., within five degrees of parallel or within two degrees of parallel) and that are both substantially parallel to the first fixed rail member 414 (e.g., within five degrees of parallel or within two degrees of parallel). In some implementations, the fourth fixed rail member 420 can be part of the frame member 404 of the housing 410.

The dimensions of the housing and of the first slot 412 can correspond to the dimensions of a pre-filter, so that the pre-filter can be slid in the slot 412 into its operating position in the housing 410 from the side of the housing 410. For example, a width of the first slot 412 between the first fixed rail member 414 and the second fixed rail member 416 can be approximately equal to a thickness of a frame of the pre-filter, so that the frame of the pre-filter can be slid along the slot 412. In some implementations, a distance between the first fixed rail member 414 and the second fixed rail member 416 can be less than 110% of a thickness of a frame of the pre-filter, so that the frame of the pre-filter can be slid along the slot 412.

In some implementations, a surface of the first fixed rail member 414 that faces the second rail member 416 and/or a surface of the second fixed rail member 416 that faces the first fixed rail member 414 can include a material that is deformable by a frame of the pre-filter, so that the frame can fit snugly into the slot and can be held in position by friction with the deformable material. In some implementations, the deformable material can include felt, silicone, rubber, or the like. Thus, the slot 412 can guide the movement of the pre-filter in a plane, as the pre-filter is slid through the slot into its operating position that is also in the plane.

The second slot 432 can be defined by a fixed rail member 434 and a movable rail member 436 that is substantially parallel to the fixed rail member 434 (e.g., within five degrees of parallel or within two degrees of parallel). In some implementations, the fixed rail member 434 can be part of a frame member 404 of the housing 410. The movable rail member 436 can be configured to move substantially perpendicular (e.g., within five degrees of perpendicular or within two degrees of perpendicular) to the length of the second slot 432, such that the movable rail member 436 can move between an open position distal from the fixed rail member 434 and a closed position proximate to the fixed rail member 434, to change a width of the second slot 432.

The dimensions of the housing 410 and of the second slot 432 can correspond to the dimensions of an electrically enhanced filter, so that the electrically enhanced filter can be slid in the second slot 432 into position its operating position in the housing 410 from the side of the housing 410. For example, a width of the second slot 432 between the fixed rail member 434 and the movable rail member 436 can be approximately equal to a thickness of a frame of the electrically enhanced filter, so that the frame of the electrically enhanced filter can be slid along the slot 432. Thus, the slot 432 can guide the movement of the electrically enhanced filter in a plane, as the electrically enhanced filter is slid through the slot 432 into its operating position that is also in the plane. The movable rail 436 may be placed in an open position distal from the fixed rail member 434 when the electrically enhanced filter is slid through the slot.

When the electrically enhanced filter has been slid into its operating position, a locking mechanism can be used to clamp the electrically enhanced filter securely into its operating position by moving the movable rail member 436 into a closed position proximate to the fixed rail member 434. The locking mechanism can include a first and second rotatable members 452, 462 at either end of the movable rail member 436, where the rotatable members are coupled to ends of the movable rail member 436 in such a manner that rotation of the rotatable members causes translational motion of the movable rail member substantially perpendicular (e.g., within five degrees of perpendicular or within two degrees of perpendicular) to the length of the second slot. For example, the movable rail member 436 can be attached to the rotatable member 452, 462 by bolts 454, 464 that pass through slots 456, 466 in the movable rail member and that are fastened to the rotatable members 452, 462, where the slots are substantially parallel (e.g., within five degrees of parallel or within two degrees of parallel) to the length of the movable rail member. A lever 472 can be attached to a rotatable member 452 and used to rotate the rotatable member by pivoting the lever about a fulcrum point. The rotatable member 452 can be coupled to the other rotatable member 462 by a connecting bar 474 (e.g., by fasteners 444, 468), such that the rotation of rotatable member 452 by the pivoting motion of the lever 472 also causes rotation of the other rotatable member 462. Rotation of the rotatable members 452, 462 causes the bolts 454, 464 to move perpendicular to the slot 432, thus causing the movable rail member 436 also to move perpendicular to the slot 432, because the movable rail member 436 is coupled to the bolts 454, 464 through the slots 456, 466 in the movable rail member.

The translational motion of the movable rail member 436 substantially perpendicular (e.g., within five degrees of perpendicular or within two degrees of perpendicular) to the length of the second slot 432 can be used to change the width of the second slot. Thus, the electrically enhanced filter can be slid along the second slot 432 into its operating position when the movable rail member 436 is in its open position, and then, when the movable rail member is in its operating position, the movable rail member 436 can be moved into its closed position to clamp the filter securely into place. In some implementations, a gasket can be placed between a front-end assembly of the electrically enhanced filter and the fixed rail member 434, so that when the movable rail member is clamped into place, the gasket is compressed to form an airtight interface between the front-end assembly of the filter and the fixed rail member.

In some implementations, the interaction between the lever 472 and rotatable member 452 can cause the movable rail member 436 to overcompress the front-end assembly 130 against the gasket shortly before the lever 472 reaches its fully closed position. Then, additional motion of the lever 472 into its fully closed position moves the bolts 454, 464 slightly away from the fixed rail member 434, slightly increasing the width of the second slot 432, and decreasing the compressive force on the gasket. Because an increased compressive force must be overcome to move the lever 472 out of its fully closed position, this allows the lever 472 to be locked in place when it passes the over-compression point without needing additional locking bolts, pins, or screws. This self-locking aspect of the locking mechanism allows for the electrically enhanced filter to be serviced without tools. Additionally, when the electrically enhanced filter is secured in its operating position with the movable rail member 436 in the closed position and clamping the filter against the fixed rail member 434, the electrically enhanced filter can be positioned such that a ground connection is established automatically, without additional wiring by a person, between the control grids of the filter and a ground connection of the module 400 and such that a high voltage connection is established between a high voltage transfer grid of the filter and a power control unit of the module.

Figures 4D, 4E, 4F:
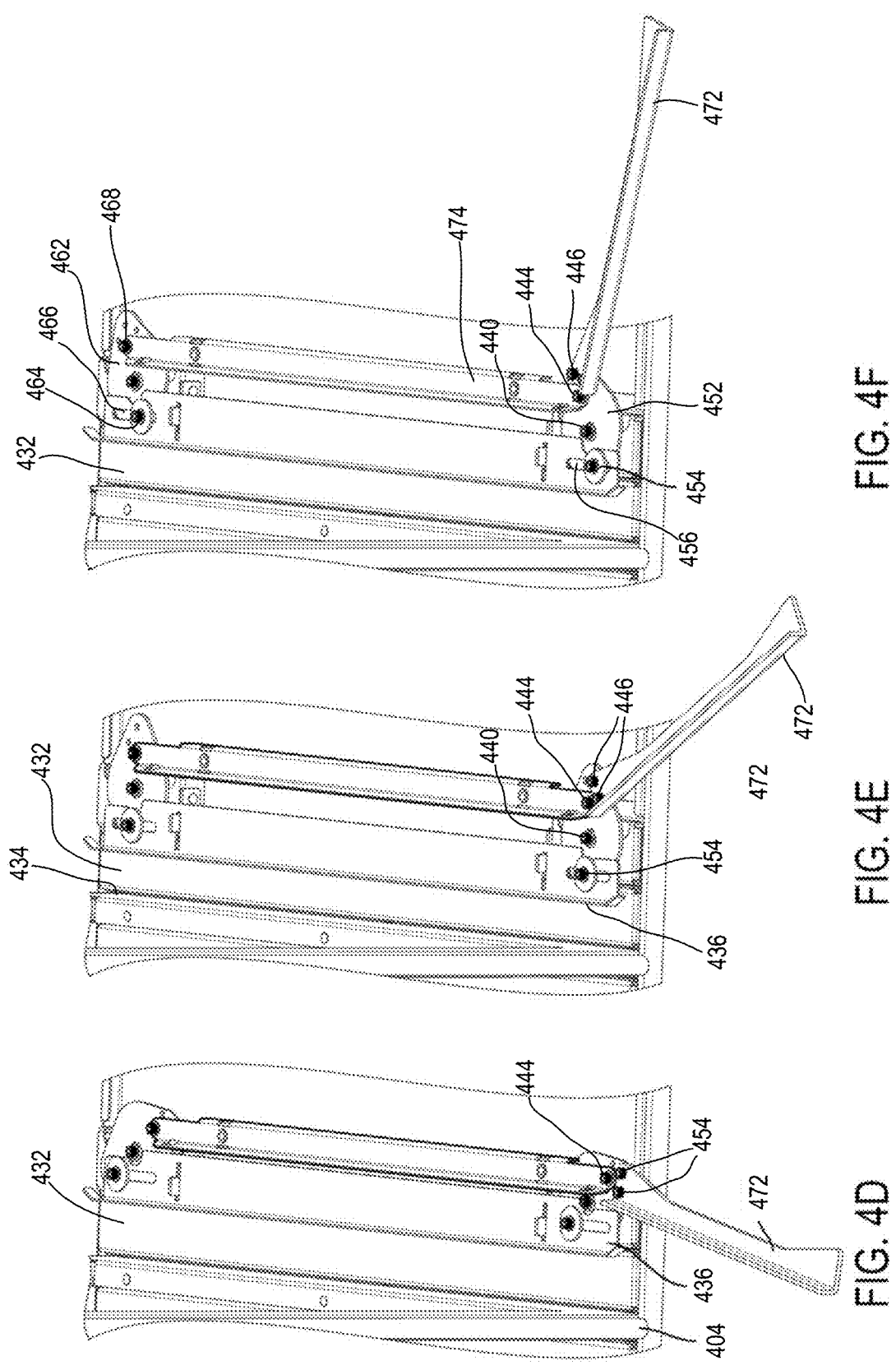

Referring particularly to FIGS. 4D, 4E, 4F, the rotatable member 452 can be configured to rotate about a pivot point 440 (e.g., that can be defined by a pin, bolt, or fastener). One side of the rotatable member 452 can be attached to the movable rail member 436 by a fastener 454 and another (e.g., opposite) side of the rotatable member 452 can be attached to the connecting bar 474 by way of a fastener 444. The lever 472 also is attached to the rotatable member 452 by way of one or more fasteners 446, 444, where one or the fasteners 444 can be a fulcrum point for the lever. Then, moving the lever 472 about the fulcrum point can cause rotation of the rotable member 452, which, in turn, moves the fasteners 454, 444 attached to the pivotable member and the movable rail member 436 and the connecting bar 474 that are attached to the rotatable member 452 by way of the fasteners 444, 454. This movement of the movable rail member results in translational motion of the rail member 436 substantially perpendicular (e.g., within five degrees of perpendicular or within two degrees of perpendicular) to the slot 432.

Figures 5A, 5B, 5C:
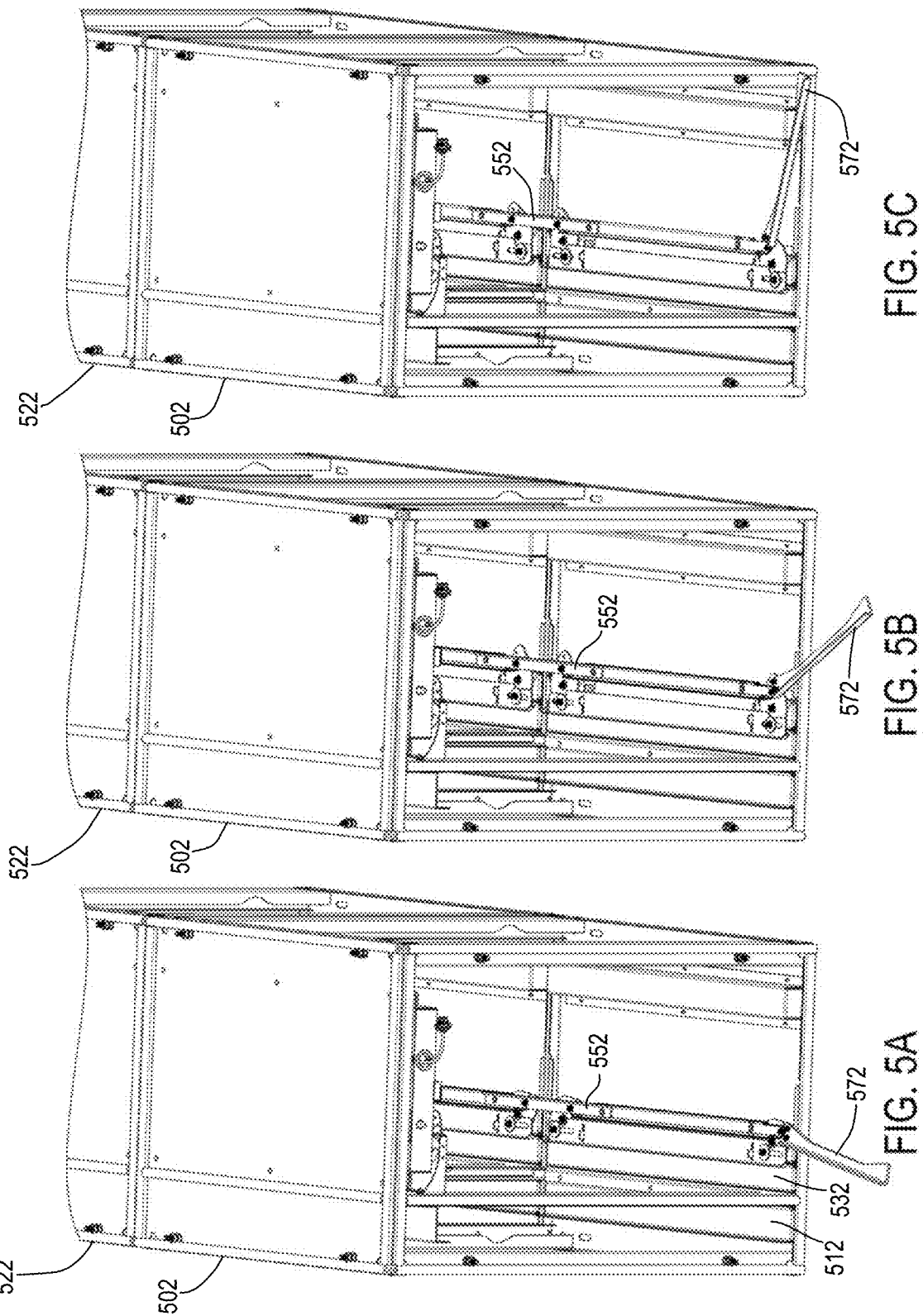
FIGS. 5A, 5B, 5C are schematic views of a mechanical locking mechanism used in an array of modules of a modular sideload disinfecting filtration system.

FIGS. 5A, 5B, 5C are schematic views of a mechanical locking mechanism used in an array of modules of a modular sideload disinfecting filtration system. A first module 502 can be connected to a second module 522, where the modules 502, 522 are arranged in a row of the array. With the modules 502, 522 connected in a planar row, a continuous first slot 512 in a first plane can be formed along a length of the modules in the row, because the first slots of the individual modules align and are configured to provide one continuous slot along which more than one pre-filter can be slid. Similarly, a continuous second slot 532 in a second plane can be formed along a length of the modules in the row, because the second slots of the individual modules align and are configured to provide one continuous slot along which more than one electrically enhanced filter can be slid.

Furthermore, the locking mechanisms of the different modules 502, 522 in the row can be coupled to each other, so that they can operate in unison to secure electrically enhanced filters into their operating positions in the different modules. For example, a connecting bar 552 can couple locking mechanisms of adjacent connected modules, so that one lever 572 can be used to operate all of the locking mechanisms of the different modules. Accordingly, the electrically enhanced filters can be secured into their operating positions by operation of one lever located at an end of the row of modules 502, 522, thus enabling an operator to replace and secure the filters from the side of the row when the row of modules is located in a duct system and some modules may be difficult to access.

Thus, the locking mechanism can act as a clamp that positions and secures two or more electrically enhanced filters of the modules 502, 522 in a row into an airtight interface with the housings of the respective disinfecting filter assembly modules. The clamp can bind or press the two or more electrically enhanced filters into position in an airtight interface with the housings of the modules 502, 522. Although a lever-driven clamp is shown in FIGS. 4A, 4B, 4C, 4D, 4E, 4F, 5A, 5B, 5C, other types of clamps also can be used. For example, a screw-driven clamp or a spring-driven clamp can be used.

Figure 6:
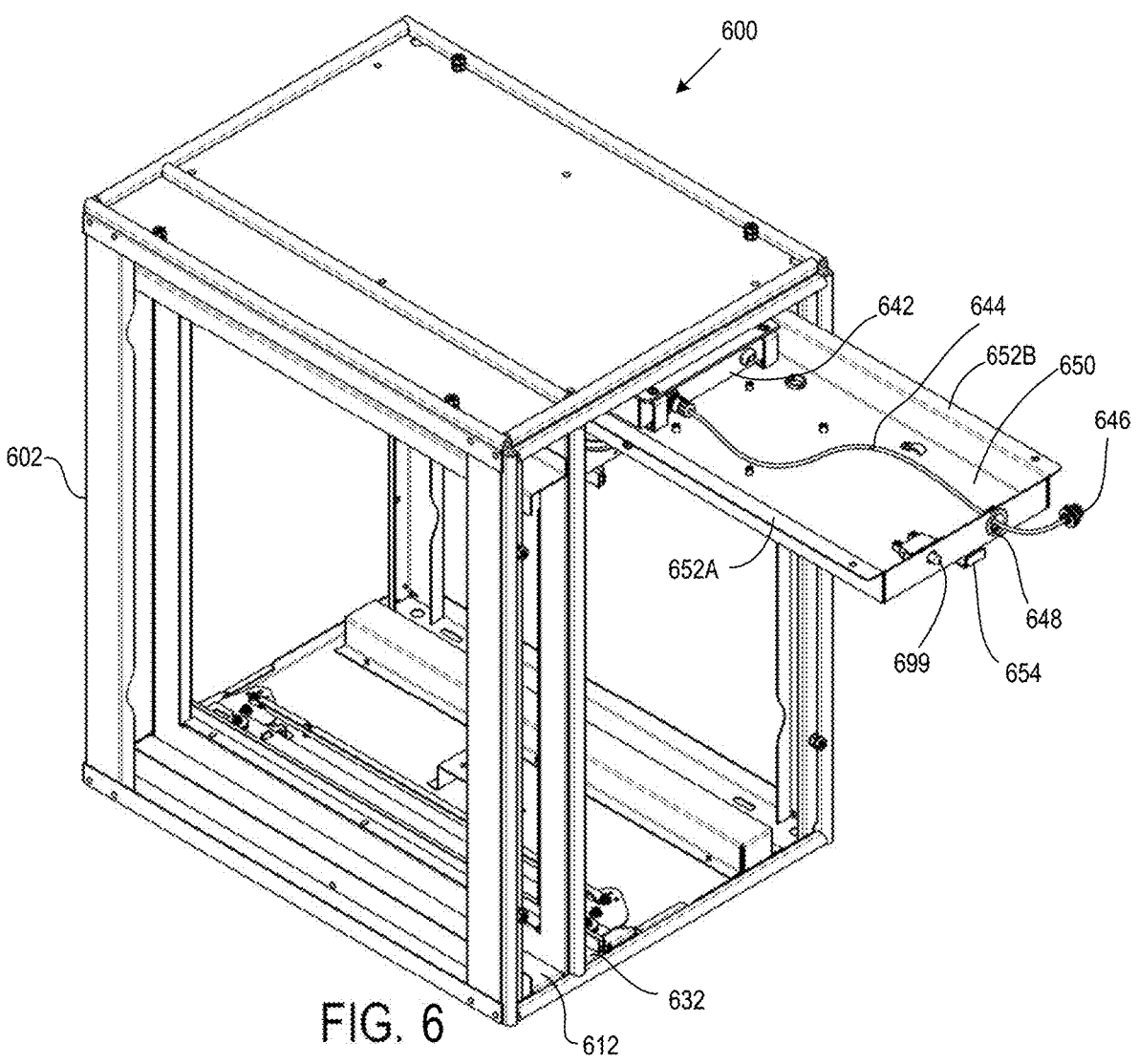
FIG. 6 is a schematic perspective view of a housing of a module of a modular sideload disinfecting filtration system.

FIG. 6 is a schematic perspective view of a housing of a module 600 of a modular sideload disinfecting filtration system. The module includes a housing 602 that can define a first slot 612 for receiving a pre-filter and a second slot 632 for receiving an electrically enhanced filter. The module 600 also includes a power control unit 642 that can control the electrical power provided to an electrically enhanced filter located in the module 600. The power control unit 642 of the module can be connected to an adjacent module by a cable 644, so that the power control units of the adjacent modules can be connected in parallel. The connection to the adjacent module can be made through a connector 646 at the end of the cable 644, which can form, for example, a plug and socket connection with the adjacent module. The cable 644 can pass through a grommet 648 in an outer wall of a tray 650, where the tray houses the power control until 642 and a portion of the cable 644. The tray 650 can be open when a connection is made to an adjacent module and closed once the connection is made and the adjacent modules are physically connected in a row.

The tray 650 can include rails or flanges 652A, 652B that can slide along corresponding grooves, slots, or rails of the housing 602 to slide the tray 650 and its power control unit 642 into an operating position in the module 600. The tray 650 can include a mechanical connector 654 configured for establishing a physical connection with a tray of an adjacent module in a row of an array of modules. The mechanical connector 654 can include, for example, a tab or a hook that mates with a flange of a tray of an adjacent module, a fastener (e.g., a threaded rod that fits through a corresponding hole of an adjacent, one part of a hook-and-loop connector, one part of a magnetic connector, etc.). In this manner, electrical connections between power control units 642 of adjacent modules in a row of an array of connected modules can be established by way of the cables 644 of the modules, and the tray 650 that house the power control units 642 can be physically connected, so that the trays of the modules in a row can be moved together in concert with each other. For example, to access a power control unit 642 of an interior module (i.e., a module that is not located at an access end of the row), the tray of the module at the access end of the row and all or the trays between the interior module and the module at the access end of the row can be pulled out of row. In this manner, a power control unit located in any module of the row may be easily accessed (e.g., for replacement or servicing) from the access end of the row.

In some implementations, the tray 650 can include one or more mechanical interlocks 699 that are configured for determining that the tray is correctly located in an operating position. In some implementations, the mechanical interlock 699 can include a plunger that makes or breaks an electrical connection depending on its position within the interlock. In some implementations, the interlock can indicate that the tray is correctly position with respect to a tray of an adjacent module, with respect to an access panel 306 of a module, or with respect to a backplate 300 of a module.

FIG. 7 is a flow chart of a process 700 for placing filters into a modular sideload disinfecting filtration system. The system includes a row of a plurality of connected disinfecting filter assembly modules located adjacent to each other in a row and being configured to filter air that passes through the array as the air flows along an airflow pathway through the array, each module including a housing that includes a power control unit and that defines a first slot and a second slot, the first slots of the housings of the adjacent modules being aligned in a first plane and the second slots of the housings of the adjacent modules being aligned in a second plane. The process includes sliding a plurality of pre-filters through the first slot of a first module of the row, such that each pre-filter is disposed in the first slot of its respective module in a first plane substantially perpendicular to the airflow pathway (702). The process includes sliding a plurality of electrically enhanced filter through the second slot of the first module of the row, such that each pre-filter is disposed in the second slot of its respective module in a second plane substantially perpendicular to the airflow pathway, the second plane being downstream from the first plane along the airflow pathway (704). The process includes clamping the plurality of electrically enhanced filters into an airtight interface with the housings of the respective disinfecting filter assembly modules (706).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification. The functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed implementations.

In addition, logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A system comprising:
an array of a plurality of connected disinfecting filter assembly modules and configured to filter air that passes through the array as the air flows along an airflow pathway through the array, each disinfecting filter assembly module including:
a housing that defines a first slot and a second slot;
a power control unit,
a pre-filter configured to be located in the first slot of the housing, such that it is disposed in a first plane substantially perpendicular to the airflow pathway, and
an electrically enhanced filter configured to be located in the second slot of the housing, such that it is disposed in a second plane substantially perpendicular to the airflow pathway, the second plane being downstream from the first plane along the airflow pathway, the electrically enhanced filter including a high voltage wire and a ground grid, wherein an electric field is created between the high voltage wire and the ground grid when the high voltage wire is energized to a high voltage, the electrically enhanced filter including an electrical contact pad that electrically connects the power control unit to the high voltage wire when the electrically enhanced filter is located in an operating position in the second slot of the housing; and
wherein the first slot and the second slot are accessible from a side of a disinfecting filter assembly module of the array, such that two or more pre-filters can be slid sequentially in the first plane through the first slot of the disinfecting filter assembly module into their operating positions within their respective housings of their respective assembly modules, the respective assembly modules being located adjacent to each other in a row of the array, and such that two or more electrically enhanced filters can be slid sequentially in the second plane through the second slot of the disinfecting filter assembly module into their operating positions within the respective housings of the respective assembly modules; and
a clamp configured to position the two or more electrically enhanced filters of the modules in the row into an airtight interface with the housings of the respective disinfecting filter assembly modules that include the two or more electrically enhanced filters and configured to position the two or more electrically enhanced filters of the modules in the row into an electrical ground connection of the housings of the respective disinfecting filter assembly modules that include the two or more electrically enhanced filters.

2. The system of claim 1, further comprising an electrical power input connector configured for receiving electrical power, the electrical power input connector being electrically connected to the power control units of the disinfecting filter assembly modules of the row, wherein the power control units are connected in parallel with the electrical power input connector.

3. The system of claim 2, wherein each disinfecting filter assembly module in the row of the array includes an electrical connector configured for electrically connecting the power control unit of the disinfecting filter assembly module to another disinfecting filter assembly module in the row of the array that includes the disinfecting filter assembly module.

4. The system of claim 1, wherein the housing and the second slot are configured such that upon sliding an electrically enhanced filter into its operating position in the second slot, the electrical contact pad of the electrically enhanced filter is electrically connected to the power control unit of the disinfecting filter assembly module in which the electrically enhanced filter is located.

5. The system of claim 1, wherein the housing and the second slot are configured such that upon sliding an electrically enhanced filter into its operating position in the second slot, the ground grid of the electrically enhanced filter is electrically connected to an electrically grounded portion of the disinfecting filter assembly module in which the electrically enhanced filter is located.

6. The system of claim 1, wherein the housing of each disinfecting filter assembly module includes a first fixed rail member and a second fixed rail member, wherein the first and second fixed rail members define the first slot.

7. The system of claim 6, wherein a distance between the first and second fixed rail members is less than 110% of a thickness of a frame of the pre-filters that are configured to be positioned in the first slot.

8. The system of claim 6, wherein at least one of the first and second fixed rail members includes a surface facing the first slot, wherein the surface includes a material that is deformable by the a frame of the pre-filters when the pre-filters are positioned in the first slot.

9. The system of claim 1, further comprising a mechanical locking mechanism configured to position the two or more electrically enhanced filters of the modules in the row into an airtight interface with the housings of the respective disinfecting filter assembly modules that include the two or more electrically enhanced filters.

10. The system of claim 9, wherein the mechanical locking mechanism is further configured to position the two or more electrically enhanced filters of the modules in the row into an electrical ground connection the housings of the respective disinfecting filter assembly modules that include the two or more electrically enhanced filters.

11. The system of claim 9, further comprising a plurality of gaskets, with each gasket of the plurality of gaskets being positioned between a different electrically enhanced filter and the housing of the respective disinfecting filter assembly module, wherein the mechanical locking mechanism is further configured to press each of the two or more electrically enhanced filters toward its respective housing to compress the gasket between the electrically enhanced filter and the housing.

12. The system of claim 1, wherein the plurality of connected disinfecting filter assembly modules are physically connected and configured to fit into an air ducting system.

13. The system of claim 1, wherein the housing of each disinfecting filter assembly module is configured for physically connecting to an adjacent disinfecting filter assembly module in the row.

14. The system of claim 1, wherein the housing of each disinfecting filter assembly module further includes a slidable tray configured for housing the power control unit of the module, the slidable trays of the modules in the row being physically connected, such that the trays of the modules in the row move together when a tray of an outer module of the row is slid out of its module.

* * * * *